US006347765B1

(12) United States Patent
Jule et al.

(10) Patent No.: US 6,347,765 B1
(45) Date of Patent: Feb. 19, 2002

(54) DEVICE FOR ATTACHING AN AIRCRAFT ENGINE TO A STRUT

(75) Inventors: Pascal Jule, Tournefeville; Alain Porte, Colomiers; Stéphane Levert, Toulouse, all of (FR)

(73) Assignee: Aerospatiale Airbus, Paris (FR)

( * ) Notice: Subject to any disclaimer, the term of this patent is extended or adjusted under 35 U.S.C. 154(b) by 0 days.

(21) Appl. No.: 09/553,381

(22) Filed: Apr. 20, 2000

(30) Foreign Application Priority Data

May 19, 1999 (FR) .......................................... 99 06336

(51) Int. Cl.$^7$ .............................................. B64D 27/26
(52) U.S. Cl. ........................ 244/54; 60/39.31; 248/555
(58) Field of Search ................................ 244/53 R, 54, 244/55, 554–557; 60/39.31

(56) References Cited

U.S. PATENT DOCUMENTS

| 5,275,357 A | | 1/1994 | Seelen et al. | |
| 5,871,175 A | * | 2/1999 | Demonuzon et al. | 244/54 |
| 5,927,644 A | * | 7/1999 | Ellis et al. | 244/54 |
| 6,059,227 A | * | 5/2000 | Le Blaye et al. | 244/54 |

FOREIGN PATENT DOCUMENTS

| EP | 0805108 | 11/1997 |
| EP | 0844172 | 5/1998 |
| WO | WO93/11041 | 6/1993 |

* cited by examiner

Primary Examiner—Galen L. Barefoot
(74) Attorney, Agent, or Firm—Burns Doane Swecker & Mathis LLP

(57) ABSTRACT

A device for the attachment of an aircraft engine to a strut comprises a main attachment structure (18, 24) able to transmit normally to the strut forces exerted in two directions (X', Y'), whereof one is mainly parallel to the longitudinal axis (OX) of the engine and the other mainly perpendicular to said axis and to a median plane common to the engine and the strut. The device also comprises an emergency attachment structure essentially constituted by an element (10) fixed to the strut and also forming part of the main attachment structure. The element (10), preferably implemented in the form of two coupled together parts (10a, 10b), comprises a pin (42) penetrating with clearance a recess formed on the aircraft casing (C).

15 Claims, 3 Drawing Sheets

DEVICE FOR ATTACHING AN AIRCRAFT ENGINE TO A STRUT

DESCRIPTION

1. Technical Field

The invention relates to an attachment device for fixing an aircraft engine to a strut secured to a structural element of the aircraft, such as a fuselage or wing element.

The attachment device according to the invention can be used on any type of aircraft. A preferred application relates to aircraft of modern design, whose engines are equipped with very large diameter fans.

2. Prior Art

Engines equipping aircraft are either suspended to a strut fixed beneath the aircraft wing, or are laterally attached to a strut fixed to the aircraft fuselage. In both cases the link between the engine and the strut is generally provided by a front attachment device and a rear attachment device. The function of these attachment device is to transmit to the aircraft, by means of the strut, the forces produced by the engine.

To analyze the forces transmitted by the attachment devices, to the engine is allocated an orthonormal fix OXYZ, in which the OX axis, which is directed forwards is oriented in accordance with the longitudinal axis of the engine, the OY axis is oriented laterally in a horizontal plane and the OZ axis is oriented vertically upwards.

With respect to said fix, in the case of an engine suspended on the wing, the forces transmitted to the aircraft structure by the attachment devices are mainly the thrust forces of the engine, essentially applied in accordance with the OX axis, lateral forces due more particularly to a gust of wind, applied substantially in accordance with the OY axis and forces due to the weight of the engine or generated in the case of the aircraft crashing and essentially applied in accordance with the OZ axis. Moreover, attachment devices transit to the aircraft structure a moment along the OX axis and which is due to the rotary movement of the engine. In the case of an engine mounted laterally on the fuselage, the forces applied in accordance with the OY and OZ axes are reversed.

To ensure the fixing of a turbojet engine to an aircraft attachment strut, there are at present two main fixture types, namely the "core" type fixture and the "hybrid fan" type fixture.

In the core type fixture, the central casing of the turbojet engine is fixed directly to the aircraft strut by a front mount and a rear mount. In this case, the front mount simultaneously absorbs the forces along the OX, OY and OZ axes and the rear mount absorbs the forces along the OY and OZ axes, as well as the moment along the OX axis.

In the case of a hybrid fan-type fixture, a front mount is interposed between the strut and the turbojet engine fan casing and a rear mount is interposed between the strut and the central casing of the turbojet engine, as in the case of the core-type fixture. In this case, the front mount absorbs the forces along the OY and OZ axes and the rear mount absorbs the forces along the OX, OY and OZ axes, as well as the moment along the OX axis. Moreover and as is more particularly illustrated by EP-A-564 126, the absorption of the thrust along the OX axis takes place by means of two rods linking the rear mount to the front part of the central casing of the engine.

Thus, in all conventionally used aircraft engine fixing systems, there is no attachment device able to transmit to the strut both the engine thrust forces exerted along the OX axis and the lateral forces exerted along the OY axis.

As is more particularly illustrated by U.S. Pat. No. 5,275,357, the attachment devices used in existing fixture systems usually comprise an emergency attachment structure. This emergency attachment structure, which is directly connected to the strut or to an intermediate fitting, is solely stressed in the case of a fracture of one or more elements of the main attachment structure. At present, all parts of the emergency attachment structures are passive in normal operation. They do not intervene when the main attachment structure is operational. They only become active during the fracture of one or more parts of the main attachment structure. Thus, their absence would not deteriorate the transmission of forces through the main attachment structure of the attachment device.

Recent use of engines having ever increasing sizes and weights accentuates the problems such as the bending of the engine, vibrations, etc. In order to obviate such problems whilst ensuring a better weight distribution, the replacement of conventional fixing systems by a new system using three instead of two attachment device is being envisaged. In this case, the strut would be connected in front of the central casing of the engine by a front attachment device only taking up forces applied in two orthogonal directions, essentially corresponding to the longitudinal axis OX and the lateral axis OY.

To implement such an attachment device, it is not possible to use the front mount which takes up forces in accordance with the OY and OZ axes in the case of a hybrid fan-type fixture. Thus the plane of the forces to be transmitted is horizontal and no longer vertical.

In addition, the attachment device used for fulfilling this function must preferably be easily dismantlable in order to avoid any time loss during the installation or removal of the engine.

Finally, it is no longer possible to make use of one of the other attachment devices employed in conventional fixing systems, such as the front mount of the core-type fixture, which takes up the forces exerted in accordance with the OX, OY and OZ axes. Thus, due to the fact that the existing attachment devices also take up forces exerted in the OZ direction, their use would make it necessary to bring about more extensive stiffening of the strut in order to ensure a correct taking up of forces transmitted by the attachment device. This would involve adding material and would consequently, in prejudicial manner, increase the weight of the strut. Moreover, this would run counter to an improvement to the performance characteristics of the engine sought by the use of a novel fixing system including a front attachment device only taking up forces mainly applied in accordance with the OX longitudinal axis and the OY axis.

DESCRIPTION OF THE INVENTION

The main object of the invention is a simplified attachment device usable in a novel system for fixing an aircraft engine to a strut, in order to solely ensure the transmission of thrust forces and lateral forces, in a reduced space location and whilst bringing about a minimum disturbance to the aerodynamic air flow.

In secondary manner, a further object of the invention is an attachment device which, if necessary, can be easily dismantled.

According to the invention, this result is obtained by means of a device for the attachment of an aircraft engine to a strut fixed to a structural element of the aircraft, said device comprising a main attachment structure and an emergency attachment structure, characterized in that the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure.

Bearing in mind the essential function which it fulfils in the attachment device according to the invention, the element common to the main attachment structure and the emergency attachment structure advantageously comprises at least two separate parts able to independently transmit the forces oriented in accordance with the first and the second directions. Thus, if one of the two parts fractures, the forces continue to be transmitted through the other part.

The engine casing and the element common to the main attachment structure and the emergency attachment structure form two adjacent members. In a preferred embodiment of the invention, a first of said members comprises a pin, which projects with clearance into a recess linked with the second member, parallel to a third axis, perpendicular to the longitudinal axis and to the transverse axis of the engine, so as to never be in contact with the walls of the recess when the main attachment structure is operational.

Advantageously, the end of the pin is then normally separated from the bottom of the recess by a distance such that said end can bear against said bottom in order to transmit to the strut forces exerted parallel to the third axis, when the aircraft lands without wheels down.

Preferably, half of the pin is in each of the parts forming the element common to the main attachment structure and the emergency attachment structure.

According to a first embodiment of the invention, the main attachment structure also comprises a crossbar essentially articulated in its centre to said element, two first rods articulated to each of the ends of the crossbar, so as to connect the same to a casing of the engine, mainly in accordance with the first direction, and a third rod directly articulated between said element and the engine casing, substantially in accordance with the second direction.

In this arrangement, the crossbar is preferably articulated to the element common to the main attachment structure and to the emergency attachment structure by a hinge pin mainly parallel to the third axis and located in the median plane.

According to a second embodiment of the invention, the main attachment structure also comprises two rods directly articulated between said element and the engine casing and oriented substantially symmetrically with respect to the median plane, in two intermediate directions between the first direction and the second direction.

In all embodiments, the rods are advantageously articulated by swivel pins. This arrangement ensures that parasitic forces, i.e. oriented in a direction different from the first and second aforementioned force transmission directions, do not pass through the attachment device.

In the case where the engine is a turbojet engine, the attachment device according to the invention is advantageously used for linking the strut with the central casing of said turbojet engine.

Preferably, the element common to the main attachment structure and to the emergency attachment structure comprises a disconnection plane for fixing to the strut by fixing means.

BRIEF DESCRIPTION OF THE DRAWINGS

A description is given hereinafter of two preferred, non-limitative embodiments of the invention, with reference to the attached drawings, wherein show.

DETAILED DESCRIPTION OF TWO PREFERRED EMBODIMENTS OF THE INVENTION

Figure 1:
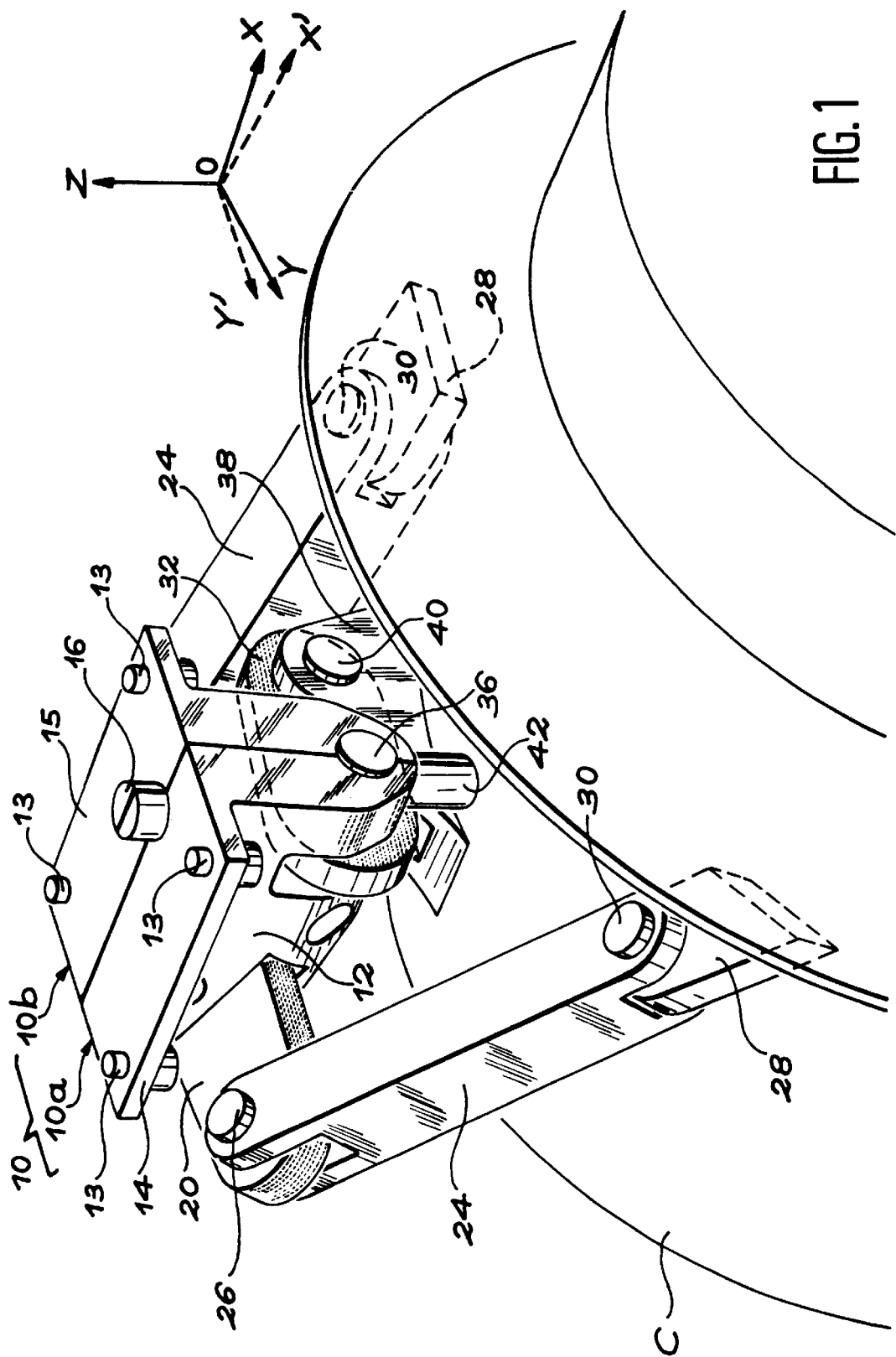
FIG. 1 A perspective view illustrating a first embodiment of an attachment device according to the invention.
Figure 2:
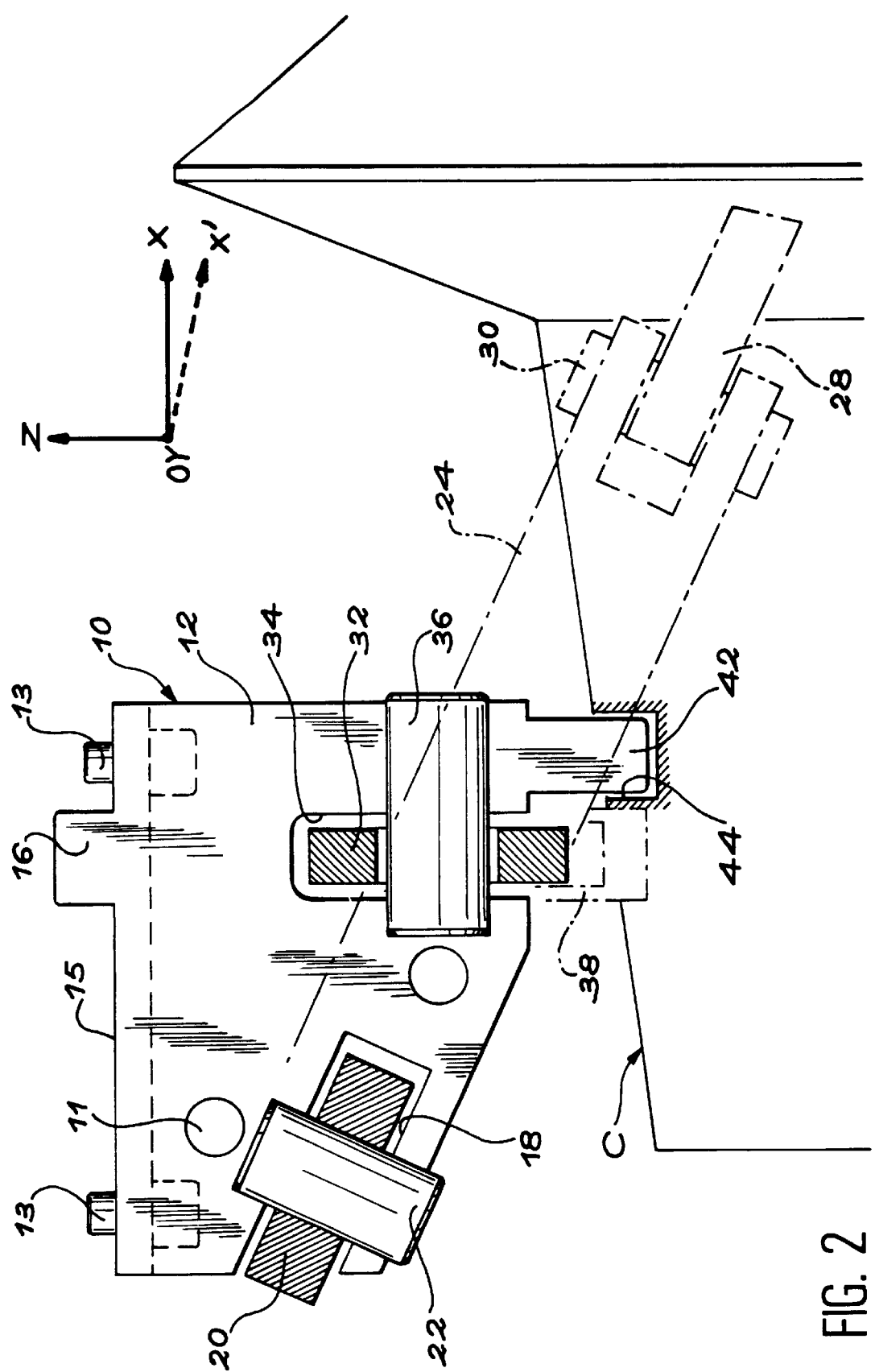
FIG. 2 A section of the device of FIG. 1 in accordance with a median plane common to said device and to the strut.

FIGS. 1 and 2 show a first embodiment of an attachment device according to the invention, applied in the case of an engine fitted beneath the wing of an aircraft. In a not shown variant, an identical attachment device, but which is differently oriented, can be used for laterally fitting an engine against the fuselage of an aircraft.

The attachment device shown in FIGS. 1 and 2 makes it possible to connect a casing C of the engine, which is to be attached to a not shown strut fixed beneath the wing of the aircraft. In the most frequent case where the aircraft engine is a turbojet engine, the attachment device according to the invention is advantageously interposed between the strut and the central casing C of said engine.

According to an essential feature of the invention, the attachment device illustrated in FIGS. 1 and 2 is a particularly simple and compact device dimensioned and optimized so as to only transmit to the strut the forces exerted by the engine in two orthogonal directions.

More specifically, the attachment device is designed for transmitting to the strut forces exerted in a first direction, mainly parallel to the longitudinal axis of the engine, and according to a second direction, mainly parallel to a transverse axis of the engine, perpendicular to the longitudinal axis and to a median plane common to the engine and to the strut.

Thus, in an orthonormal fix OXYZ, in which the OX axis is oriented forwards along the longitudinal axis of the engine, the OY axis is oriented laterally, i.e. perpendicular to a median plane of the engine and the strut, and the OZ axis is oriented vertically upwards, the attachment device according to the invention ensures the transmission to the strut of forces exerted in a first direction X', mainly oriented in accordance with the OX axis and in a second direction Y' mainly oriented along the OY axis. In other words, the main components of the directions X' and Y' are respectively oriented in accordance with the OX and OY axes.

In the not shown case where the attachment device is applied to the fixing of an engine to the fuselage of an aircraft, the forces transmitted by said device are mainly oriented in accordance with the OX and OY axes.

Like the attachment devices used in conventional fixing systems of the core and hybrid fan types, the attachment device according to the invention comprises a main attachment structure, which normally ensures the integral transmission of forces when it is operational, and an emergency attachment structure, through which passes part of the forces to be transmitted following the fracture of one of the parts of the main attachment structure.

In the attachment device according to the invention, the main attachment structure and the emergency attachment structure comprise a common element, designated in general terms by the reference 10 in the drawings.

Bearing in mind the vital function within the attachment device, the element 10 is formed by two separate parts 10a and 10b, through which pass all the forces transmitted between the engine and the strut under both normal and emergency conditions. More specifically, each of the parts 10a and 10b forming the element 10 is in itself able to transfer all these forces.

Each of the parts 10a and 10b is L-shaped in section in the vertical plane YOZ. The two parts 10a and 10b are joined back to back in such a way that the thus formed element 10 is shaped like a T in section in the plane YOZ. The parts 10a and 10b are assembled with one another, e.g. by means of bolts 11 (FIG. 2) or barrel nuts for locking the spindle of the rudder bar 20.

Thus, the element 10 comprises a vertical anchoring fitting 12, half formed in each of the parts 10a and 10b, as well as a horizontal base plate 14, also half formed in each of the two parts constituting the element 10.

The plane upper face 15 of the base plate 14 of the element 10 forms a disconnection plane for fixing beneath the attachment strut suspended on the wing by any appropriate fixing means such as screws 13, barrel nuts, etc.

To ensure the transmission to the strut of the forces transiting by the attachment device element 10, a cylindrical pin 16 projects over the planar upper face 15 of the element 10. When the latter is fixed beneath the strut, the pin 16 penetrates without clearance into a not shown cylindrical hole provided for this purpose in the strut. The absorption of the forces in directions X' and Y' is consequently ensured. As shown in FIG. 1, the pin 16 is half implemented in each of the two parts 10a, 10b, whose interface passes through the vertical axis of the pin.

The anchor fitting 12 projects downwards from the base plate 14, in the vertical, median plane OXZ common to the engine and to the strut.

In its rear part (to the left in FIG. 2) with respect to the air flow direction, the anchor fitting 12 is traversed in the lateral direction OY by a slot 18. Said slot 18 is actually located in a downwardly inclined plane on passing towards the front of the engine. The inter-section of said plane with the median plane OXZ corresponds to the first direction X' of the forces to be absorbed.

A crossbar 20 traverses the slot 18 and is articulated on the anchor fitting 12, substantially in its centre, by a pivot pin 22. Pin 22 is perpendicular to the inclined plane OX'Y. The crossbar 20 is oriented transversely, in a mean direction substantially parallel to the OY axis. It forms an integral part of the main attachment structure, as do the pivot pin 22 and the element 10.

As is more particularly illustrated in FIG. 1, the main attachment structure also comprises two rods 24, each connecting the ends of the crossbar 20 to the engine casing C.

A first end of each of the rods 24 forms a female cap, articulated on the corresponding end of the crossbar 20 by a pivot pin 26. Said pivot pin 26 is itself fitted to the end of the crossbar 20 by means of a not shown ball joint.

The other end of each of the rods 24 also forms a female cap, articulated to a male cap 28 provided for this purpose on the engine casing C by means of a pivot pin 30. The pivot pin 30 is itself fitted in the male cap 28 by means of a not shown ball joint.

The relative arrangement of the crossbar 20 and caps 28 connected to the casing C is such that the rods 24 are oriented rearwards, starting from the caps 28, in directions mainly parallel to the longitudinal axis OX of the engine. The rods 24 are located in the inclined plane X'OY and approach one another on passing rearwards.

The hitherto described elements of the attachment structure ensure the taking up of forces in the first direction X'.

In order to ensure the taking up of forces in the second direction Y', the main attachment structure also comprises a third rod 32, linking the anchor fitting 12 to the engine casing C in accordance with the lateral axis OY. More specifically, the third rod 32 is located in a plane parallel to the YOZ plane.

A first end of the rod 32 is received in a slot 34 machined, in accordance with said YOZ plane, in the front part of the anchor fitting 12. This first end of the rod 32 is articulated in the fitting 12 by a hinge pin 36 oriented in accordance with the longitudinal axis OX of the engine. The pin 36 is fitted in the third rod 32 by means of a not shown ball joint. It should be noted that the joint face of the parts 10a and 10b forming the element 10 passes through the geometrical axis of the hinge pin 36.

The second end of the rod 32 is articulated in a female cap 38, integral with the engine casing C, by a hinge pin 40. Said hinge pin 40 is mounted in the rod 32 by means of a not shown ball joint.

This arrangement enables the rod 32 to transmit to the strut by means of the element 10 lateral forces, in accordance with direction Y', exerted by the engine.

It should be noted that apart from the element 10, all the parts forming the main attachment structure are one-piece parts, which give said structure a great simplicity.

The emergency attachment structure is essentially constituted by the element 10. To fulfil this function, the element 10 comprises a cylindrical pin 42 projecting radially towards the engine casing C, parallel to the axis OZ. This pin 42 is implemented half in each of the parts 10a and 10b, whose interface passes through the vertical axis of the pin.

As is more particularly illustrated by FIG. 2, the pin 42 penetrates with clearance into a cylindrical recess 44 formed on the engine casing C. Between the circumferential walls of the pin 42 and the recess 44 there is a clearance such that said walls never come into contact with one another when the main attachment structure is operational.

Thus, when all the parts of the attachment device described hereinbefore are in the operating state and when the aircraft is on the ground, the assembly formed by the crossbar 20 and the rods 24 is naturally balanced, because the crossbar pivots freely about the pin 22. The thrust forces exerted by the engine along the OX axis pass through the rods 24, the crossbar 20, the pin 22 and the element 10 up to the not shown strut. The lateral forces caused by the wind and exerted by the engine in accordance with the OY axis pass through the rod 32 and then the element 10 up to the not shown strut. The element 10, which forms the emergency attachment structure, is consequently permanently active, i.e. even in the absence of a fracture of part of the main attachment structure.

When the aircraft is flying, the device is subject to thrust forces in accordance with the OX axis, to lateral forces in accordance with the OY axis and forces due to the engine weight in accordance with the OZ axis.

The thrust forces are largely taken up by the assembly constituted by the rods 24—crossbar 20 and element 10, as explained hereinbefore.

The lateral forces, e.g. due to a gust of wind, are largely taken up by the assembly constituted by the rod 32 and element 10, as explained hereinbefore.

Finally, the forces due to the engine weight are largely taken up by one or several other not shown attachment devices by which the engine is also connected to the strut. As described hereinbefore, the rods 24 are articulated to the crossbar 20 and to the casing C by swivel pins and the rod 32 is articulated to the element 10 and to the casing C by swivel pins. Consequently, if a small part of the forces due to the weight and exerted in accordance with the OZ axis is not absorbed by another attachment device of the fixing system, it can in no way be transmitted by the attachment system described.

Preferably, the end of the pin 42 is normally separated from the bottom of the recess 44 by a predetermined distance, so as to ensure that no contact is possible when all the parts of the device are in the operating state. However, said distance is chosen so that the bottom of the recess bears against the end of the pin during a landing of the aircraft without the wheels down. Part of the forces then exerted by the engine in the vertical direction OZ is consequently transmitted to the strut through the attachment device.

In the case of the fracture of one of the parts constituting the main attachment structure, the element 10 becomes active constituting the emergency attachment structure.

Thus, if one of the rods 24, one of the ends of the crossbar 20, or one of the pins 26 and 30 breaks, element 10 automatically ensures the passage of the forces exerted in the X' direction, in association with the still integral part of the crossbar 20, rods 24-pins 26, 30 assembly. This function is obtained by the bearing of the pin 42 against the trailing edge of the recess 44.

Moreover, in the case of a breakage of the rod 32 or of one of the pins 36 and 40, the element 10 automatically and integrally ensures the passage of the lateral forces exerted in the Y' direction. This function is obtained by the bearing of the pin 42 against the corresponding lateral edge of the recess 44.

Figure 3:
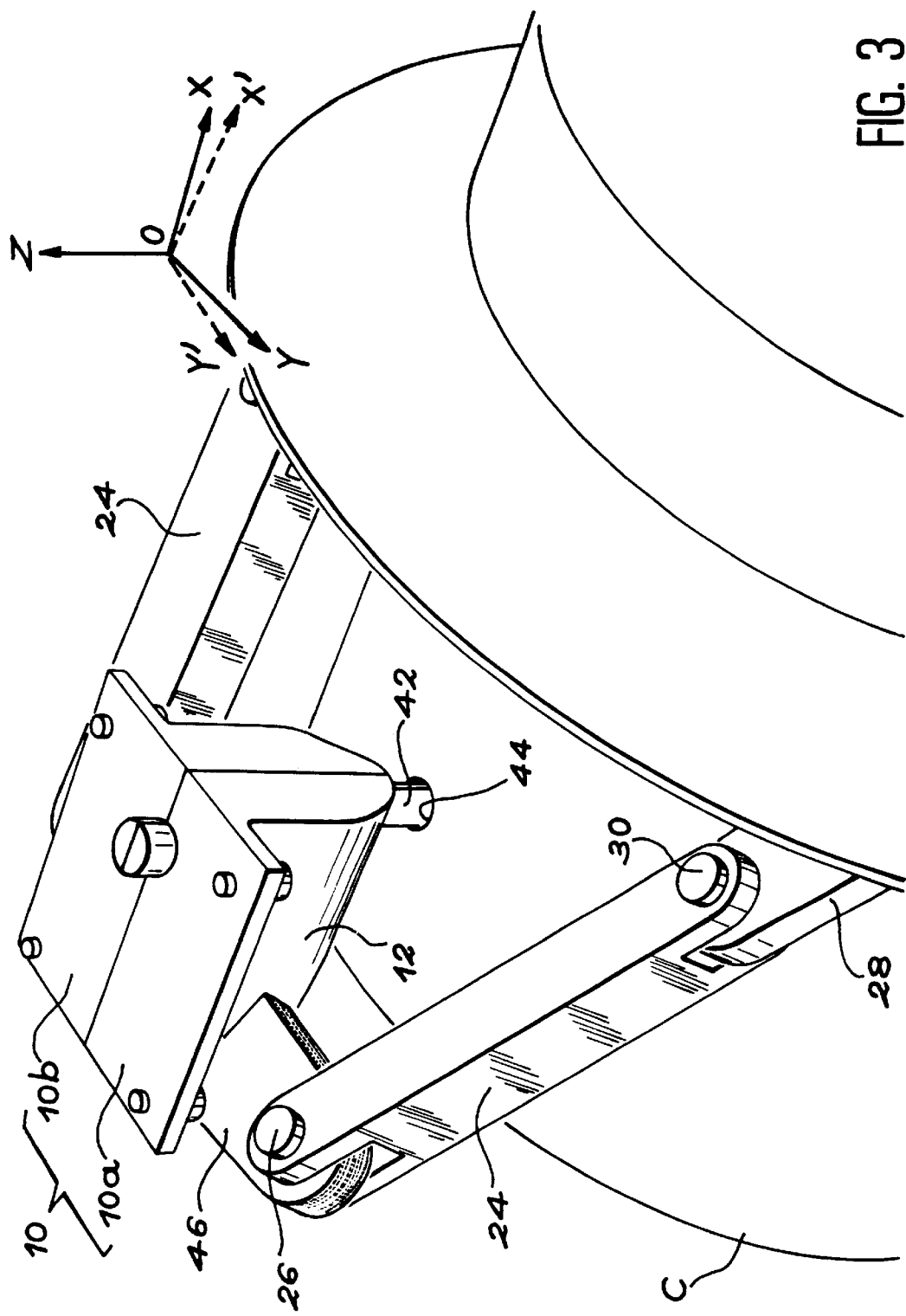
FIG. 3 A perspective view illustrating a second embodiment of the invention.

The second embodiment of the invention illustrated in FIG. 3 firstly differs from the first embodiment by the fact that the crossbar is eliminated and the rods 24 are directly articulated to the element 10 by pins 26.

The elimination of the crossbar makes it possible for the rods 24 to also transmit to the strut the lateral forces exerted by the engine through the element 10. Consequently the second embodiment illustrated in FIG. 3 also differs from the first by the fact that the third rod 32 is eliminated.

The element 10, whose general form remains unchanged, in this case comprises two lugs 46 (whereof only one is visible in FIG. 3). Each lug 46 is formed in one piece with one of the parts 10a, 10b forming the element 10 and extends in the lateral direction Y on either side of the anchor fitting 12, in a plane X'OY identical to that of the crossbar 20 in the first embodiment.

Instead of being articulated to the ends of the crossbar 20, the female caps formed at the ends of the rods 24 are articulated to the lugs 46 by pins 26. The pins 26 are fitted in lugs 46 by means of not shown ball joints. There is no change to the connection between the opposite ends of the rods 24 and the casing C by means of the pins 30 and caps 28. Thus, the rods 24 are oriented substantially symmetrically with respect to the median plane XOZ in two directions intermediate between the directions X' and Y'.

Finally, the emergency attachment structure, materialized by the element 10, is the same as in the first embodiment. In particular, forces are absorbed by the bearing of the circumferential wall of the recess 44 formed in the casing C on the pin 42 integral with the element 10, in the case of the fracture of any one of the component parts of the main attachment structure.

Obviously, the invention is not limited to the embodiment described in exemplified manner hereinbefore. Thus, at least certain of the male and female caps linking the different parts of the device through pivot pins can be reversed without passing beyond the scope of the invention. Moreover, although the device is advantageously placed between a strut and a central turbojet engine casing, it can also be used for connecting a strut to any other aircraft engine casing. Finally, as has been stated, such a device can also be used with an engine fixed laterally to an aircraft fuselage.

We claim:

1. Device for the attachment of an aircraft engine to a strut fixed to a structural element of the aircraft, said device comprising:

a main attachment structure; and an emergency attachment structure, wherein the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure.

2. Device according to claim 1, wherein said element comprises at least two separate parts, able to transmit independently of one another forces oriented in the first direction and in the second direction.

3. Device according to claim 2, wherein said element comprises a disconnection plane for fixing to the strut by fixing means.

4. Device according to claim 1, wherein said element comprises a disconnection plane for fixing to the strut by fixing means.

5. Device for the attachment of an aircraft engine to a strut fixed to a structural element of the aircraft, said device comprising:

a main attachment structure;

an emergency attachment structure, wherein the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure;

wherein said element comprises at least two separate parts, able to transmit independently of one another forces oriented in the first direction and in the second direction; and wherein the element fixed to the strut and an aircraft casing forms two adjacent members, one of said members comprising a pin projection with clearance into a recess linked with the other member, parallel to a third axis, perpendicular to the longitudinal axis and to the transverse axis of the engine, so as to never be in contact with the walls of the recess when the main attachment structure is operational.

6. Device according to claim 5, wherein one end of the pin is normally separated from the bottom of the recess by a distance such that said end is able to bear against said bottom, in order to transmit to the strut forces exerted parallel to the third axis during a landing of the aircraft without the wheels down.

7. Device according to claim 5, wherein the pin is half implemented in each of the parts forming said element.

8. Device according to claim 5, wherein the main attachment structure also comprises a crossbar articulated substantially in its center to said element, two first rods articulated to each of the ends of the crossbar, so as to connect the latter to a casing of the engine, mainly in the first direction, and a third rod, articulated directly between said element and the engine casing, substantially in the second direction.

9. Device according to claim 8, wherein the crossbar is articulated to the element by a hinge pin mainly parallel to the third axis, located in the median plane.

10. Device according to claim 5, wherein the main attachment structure also comprises two rods directly articulated between said element and the engine casing and oriented substantially symmetrically with respect to the median plane in two directions intermediate between the first direction and the second direction.

11. Device according to claim 8, wherein the rods are articulated by swivel pins.

12. Device according to claim 5, wherein the engine is a turbojet engine, said casing being a central casing thereof.

13. Device for the attachment of an aircraft engine to a strut fixed to a structural element of the aircraft, said device comprising:
   a main attachment structure;
   an emergency attachment structure, wherein the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure; and
   wherein the element fixed to the strut and an aircraft casing forms two adjacent members, one of said members comprising a pin projection with clearance into a recess linked with the other member, parallel to a third axis, perpendicular to the longitudinal axis and to the transverse axis of the engine, so as to never be in contact with the walls of the recess when the main attachment structure is operational.

14. Device for the attachment of an aircraft engine to a strut fixed to a structural element of the aircraft, said device comprising:
   a main attachment structure; and
   an emergency attachment structure, wherein the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure; and
   wherein the main attachment structure also comprises a crossbar articulated substantially in its center to said element, two first rods articulated to each of the ends of the crossbar, so as to connect the latter to a casing of the engine, mainly in the first direction, and a third rod, articulated directly between said element and the engine casing, substantially in the second direction.

15. Device for the attachment of an aircraft engine to a strut fixed to a structural element of the aircraft, said device comprising:
   a main attachment structure; and
   an emergency attachment structure, wherein the main attachment structure only transmits forces exerted in a first direction, mainly parallel to a longitudinal axis of the engine and according to a second direction, mainly parallel to a transverse axis of the engine, perpendicular to the longitudinal axis and to a median plane common to the engine and to the strut, the emergency attachment structure comprising an element fixed to the strut, which also forms part of the main attachment structure; and
   wherein the main attachment structure also comprises two rods directly articulated between said element and the engine casing and oriented substantially symmetrically with respect to the median pane in two directions intermediate between the first direction and the second direction.

* * * * *